US009094755B2

(12) United States Patent
Babarskas et al.

(10) Patent No.: US 9,094,755 B2
(45) Date of Patent: Jul. 28, 2015

(54) AUDIO MONITORING SYSTEM AND SELECTION OF STORED TRANSMISSION DATA

(75) Inventors: Christopher Babarskas, Chicago, IL (US); Junjie Gu, Glenview, IL (US); Ryan Perkofski, Lake Villa, IL (US); Nick Wood, Chicago, IL (US); Mike Nagel, Chicago, IL (US); Mark Manthei, Wheaton, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 1147 days.

(21) Appl. No.: 12/604,124

(22) Filed: Oct. 22, 2009

(65) Prior Publication Data

US 2011/0096934 A1 Apr. 28, 2011

(51) Int. Cl.

| | |
|---|---|
| ***H04H 40/00*** | (2009.01) |
| ***H04B 7/00*** | (2006.01) |
| ***H04R 1/10*** | (2006.01) |
| ***H04R 3/12*** | (2006.01) |
| ***H04R 29/00*** | (2006.01) |
| *H04H 60/04* | (2008.01) |

(52) U.S. Cl.

CPC .. *H04R 1/10* (2013.01); *H04R 3/12* (2013.01); *H04R 29/007* (2013.01); *H04H 60/04* (2013.01); *H04R 29/008* (2013.01); *H04R 2201/107* (2013.01); *H04R 2227/003* (2013.01); *H04R 2420/07* (2013.01)

(58) Field of Classification Search

CPC ..... H03J 1/0075; H03J 1/0058; H03J 1/0091; H04H 20/01; H04H 60/41

USPC .............. 381/72, 77, 79, 80, 81, 311; 455/39, 455/41.2, 63.1, 63.3, 68, 70, 71, 3.01, 3.06, 455/41.3, 62, 66.1, 344

See application file for complete search history.

(56) References Cited

U.S. PATENT DOCUMENTS

| | | | | |
|---|---|---|---|---|
| 7,013,110 | B1 * | 3/2006 | Carpenter et al. | 455/3.06 |
| 7,181,232 | B2 * | 2/2007 | Lin et al. | 455/450 |
| 8,155,593 | B2 * | 4/2012 | Fehr | 455/62 |
| 2004/0157555 | A1 | 8/2004 | Richenstein et al. | |
| 2005/0281423 | A1 | 12/2005 | Armstrong et al. | |

(Continued)

FOREIGN PATENT DOCUMENTS

| | | |
|---|---|---|
| JP | 3076813 U | 4/2001 |

OTHER PUBLICATIONS

International Search Report and Written Opinion from PCT Application No. PCT/US2010/053114, mailed Feb. 18, 2011.

(Continued)

*Primary Examiner* — Duc Nguyen
*Assistant Examiner* — Kile Blair
(74) *Attorney, Agent, or Firm* — Banner & Witcoff, Ltd.

(57) ABSTRACT

An audio monitoring system for an audio performance consists of one or more terminal units and one or more base units. The base units are configured to send transmission data consisting of channel labels, frequencies, and mix identifiers to the terminal units. The terminal units are configured to receive and store the transmission data. The terminal units permit a user to select the stored transmission data and to display the transmission data on a user display. The terminal units can receive audio signals from the base units over the stored frequencies and are configured to output the corresponding audio signals to a sound transmission device.

24 Claims, 5 Drawing Sheets

(56) References Cited

U.S. PATENT DOCUMENTS

| | | | | |
|---|---|---|---|---|
| 2007/0087683 | A1 | 4/2007 | Hsieh et al. | |
| 2007/0117580 | A1 | 5/2007 | Fehr | |
| 2009/0220104 | A1 * | 9/2009 | Allison | 381/77 |

OTHER PUBLICATIONS

[online] 2010 [Retrieved May 25, 2010] Retrieved from http://www.mixonline.com, MIPRO Wireless Microphone Systems, Portable PA Systems, MI-808R Stereo Body Pack Receiver.

M3 Wireless In-Ear Monitor System. Instruction Manual. Audio-Technica U.S., Inc., 2009.

M2 Wireless In-Ear Monitor System. Instruction Manual. Audio-Technica U.S., Inc., 2009.

Ew 300 IEM G2. Instructions for Use. Sennheiser Electronic GmbH & Co. KG, Dec. 2003.

SR 2000 IEM & SR 2050 IEM. Instruction Manual. Sennheiser Electronic GmbH & Co. KG, Jan. 2009.

Evolutionwireless G3, SR 300 IEM. Instruction Manual. Sennheiser Electronic GmbH & Co. KG, Jan. 2009.

Evolutionwireless G3, 300 IEM Series. Instruction Manual. Sennheiser Electronic GmbH & Co. KG, Jan. 2009.

Ew 300 IEM G2 & SR 350 IEM G2. Instructions for Use. Sennheiser Electronic GmbH & Co. KG, Mar. 2008.

Evolutionwireless G3, EK 300 IEM. Instruction Manual. Sennheiser Electronic GmbH & Co. KG, Jan. 2009.

[online] Feb. 20, 2007, [retrieved on May 25, 2010 ] Retrieved from http://www.gearwire.com/akg-ivm-4-winter-namm.html, AKG IVM4.

[online] Feb. 18, 2004, [retrieved on May 25, 2010 ] Retrieved from http:// www.mixonline.com, MIPRO ACT—707D Wireless Microphone System.

[online] Jun. 19, 2009 [retrieved on May 25, 2010] Retrieved from http://www.mixoline.com, Wireless Personal Monitor AS-900.

G3 300 Series, Wireless Monitor Set. Product Specification Sheet. Sennheiser Electronic Corporation, before Oct. 22, 2009.

AS-900, Any Spot, Wireless Personal Monitor. User's Manual. Galaxy Audio, before Oct. 22, 2009.

EO3, Personal In-Ear Monitor Wireless System. Owner's Manual. Nady Systems, Inc, before Oct. 22, 2009.

PEM-500, Wireless Personal In-Ear Monitor. Owner's Manual. Nady Systems, Inc, before Oct. 22, 2009.

IVM 4, In-Ear Monitoring System. Owners Manual. AKG Acoustics, U.S., 2007.

Office Action dated Feb. 17, 2014 for CN Application No. 201080052931.6, 10 pages.

English Translation of JP3076813U.

Translation of Notice of Reasons for Rejection for Japanese Patent Application No. 2012-535288, translation dated Oct. 2, 2014, 2 pages.

* cited by examiner

AUDIO MONITORING SYSTEM AND SELECTION OF STORED TRANSMISSION DATA

TECHNICAL FIELD

Aspects of the disclosure relate to audio monitoring systems that wirelessly transmit sound mixes directly to a stage performer's ears, and in particular, to a terminal unit that can store multiple mix transmission data such that the terminal unit permits the user the ability to select between various mix signals outputted by a plurality of base units.

BACKGROUND

In musical performances there is a need for providing each performer on stage with means for hearing themselves as well as other performers on stage. These systems are the result of the high sound levels produced on stage due to the performers, sound reinforcement systems, and audiences.

Traditionally, this has been accomplished through the use of speakers mounted on stage that provide a mix or selected portions of the performance to each stage performer. Although this method works in practice and can be used in conjunction with the embodiments disclosed herein, using on stage monitors may produce harmful noise levels to the performers, restrict the mobility of the performers on stage, and can lead to interference and feedback issues.

In light of these characteristics of traditional monitoring, personal monitoring systems or in-ear monitoring systems were developed. These systems generally consist of one or more transmitters or base units that wirelessly transmit signals containing personalized mixes to individual body pack receivers or terminal units worn by each performer. The terminal units have jacks for sound-isolating earphones that are worn by the performer. These systems provide each individual performer with their own more accurate and clear personalized mix through the earphones, while providing the user with mobility on stage and while limiting the performer's exposure to high noise levels.

Current terminal units can only store one frequency setting at a time and have to be reconfigured in order to receive additional mixes outputted by the base units. This can be time consuming and takes away from the sound engineer's ability to perfect the audio mix. In addition, if a terminal unit fails, the sound engineer has to reconfigure a new terminal unit and deliver it onstage. This might not occur until an appropriate pause or break in the performance and therefore detracts from the sound engineer's ability to monitor the mix.

BRIEF SUMMARY

The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

One exemplary embodiment of the present invention provides a programmable terminal unit that is configured to toggle between or scroll among various mixes outputted by base units. The terminal unit can be loaded with a channel label, frequency information, and mix information for each different mix output by the base units. This information can be stored in a memory in the terminal unit. Each mix can be displayed on an LCD screen on the terminal unit, and each terminal unit can be provided with a toggle switch or selection buttons such that the user can select one of the mix signals output by the base units.

In an exemplary embodiment a method is disclosed where a terminal unit receives a first set of transmission data including, but not limited to, a first frequency and a first mix identifier wirelessly from a first base unit. The terminal unit then stores the first set of transmission data in a memory of the terminal unit. The terminal unit can then receive a second set of transmission data including a second frequency, and a second mix identifier wirelessly from a second base unit at the terminal unit and store the second set of transmission data in its memory. The terminal unit then can display the first or second set of transmission data on a user display on the terminal unit in response to a toggle selection from a user-input device and receive an audio signal on the terminal unit on the first or second frequency. The terminal unit then outputs the audio signal to a sound transmission device in response to the toggle selection from the user-input device. The terminal unit can receive and store additional sets of transmission data from one or more additional base units to provide for a quick way to access additional frequencies output by additional base units.

In an exemplary embodiment the transmission data can be transmitted by the base unit and received by the terminal unit via an infrared link.

In another exemplary embodiment the transmission data can be received via an infrared link or any other known wireless transmission method from one of a series of networked base units and stored in the memory of the terminal unit. The system can be configured with a user option to set a priority number on the base unit and/or a networked computer to set each channel label and order of each frequency and mix identifier.

In yet another embodiment, the terminal unit can monitor the RF environment for interference and upon detecting interference determine new frequency transmission parameters for the terminal unit and communicate the new frequency transmission parameters to the base units. In yet another embodiment, a networked scanning device can control interference detection and prompt both base and terminal units to change frequency transmission to a new clear channel.

BRIEF DESCRIPTION OF THE DRAWINGS

The present disclosure is illustrated by way of example and not limited in the accompanying FIGS..

DETAILED DESCRIPTION

Overall System Structure

Figure 1:
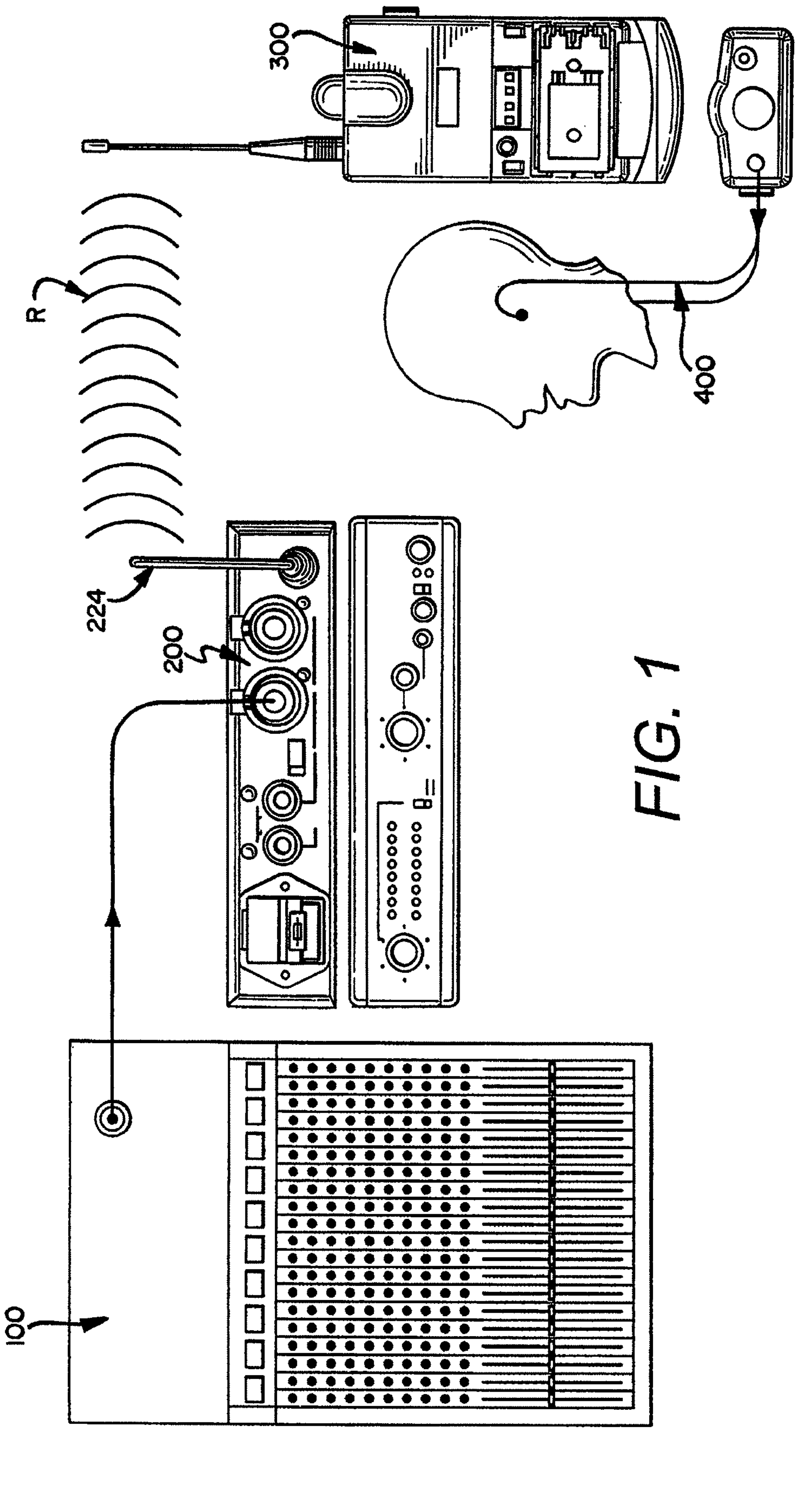
FIG. 1 depicts a schematic of an exemplary embodiment of an audio monitoring system.

FIG. 1 illustrates an example of an audio monitoring system. The audio monitoring system may include a mixer 100, one or more base units 200, and one or more terminal units 300. Additionally the audio monitoring system can consist of one or more onstage speakers, one or more recording devices, microphones, and instruments such as guitars, keyboards, drums and the like. The terminal units 300 may be coupled to a sound transmission device 400 that outputs one or more sound mixes to the user's ears.

The components of the audio monitoring system can be operably connected to each other via any known hard-wire (for example XLR or ¼" cables) or wireless links. In the exemplary embodiment shown in FIG. 1 the mixer 100 is connected to the base unit 200 via a hard-wire link, and the base unit is configured to transmit radio signals R to the terminal units 300. Also, as discussed below in further detail in one embodiment, the base unit 200 and the terminal unit may be provided with infrared syncing capabilities.

In addition the audio monitoring system can comprise a network, which may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links between the networked audio monitoring system components may be any suitable links, such as network links, dial-up links, wireless links, hard-wired links, etc. It will be appreciated that these network connections described are illustrative and other means of establishing communication links between the audio system components may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Base Unit and Terminal Unit

Figure 2:
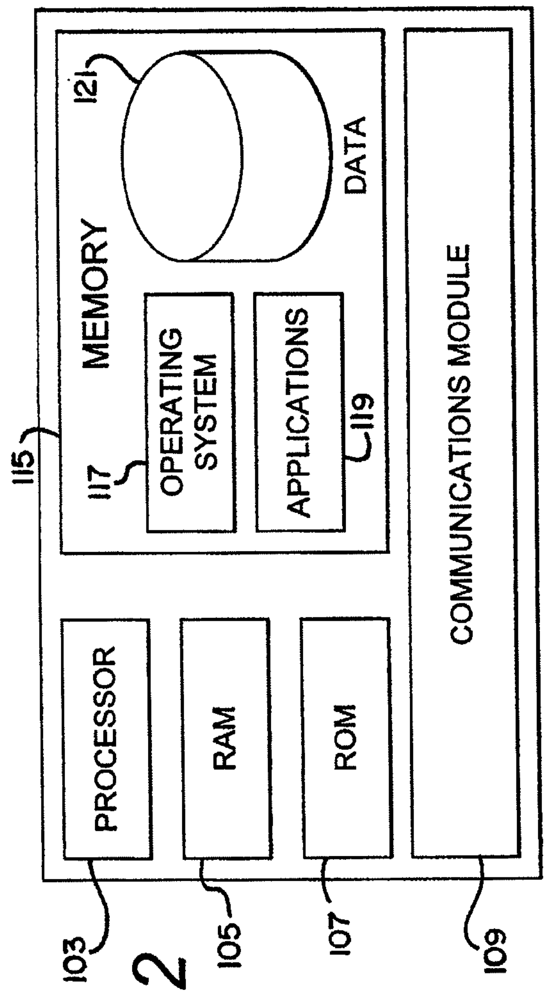
FIG. 2 depicts an illustrative schematic of hardware and software of both a base unit and a terminal unit.

FIG. 2 is a representative schematic of the hardware and software in both the base and terminal units. The base and terminal units can be provided with a processor 103 for controlling overall operation and associated components, including RAM 105, ROM 107, communications module 109, and memory 115. Both the base unit and the terminal unit can include a variety of computer readable media. Computer readable media may be any available media that may be accessed by the devices and include both volatile and non-volatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the units.

Communication media typically embodies computer readable instructions, data structures, program modules or other data in a modulated data signal such as a carrier wave or other transport mechanism and includes any information delivery media. A modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although not shown, RAM 105 may include one or more applications representing the application data stored in RAM memory 105 while the units are powered on and corresponding software applications (e.g., software tasks), are running on the units.

Communications module 109 may include push buttons, a keypad, a touch screen, and/or stylus (or any known devices) through which a user of the units may provide input, and may also include one or more speakers for providing audio output and a video display device for providing textual, audiovisual and/or graphical output.

Software may be stored within memory 115 and/or storage to provide instructions to processor 103 for enabling the units to perform various functions. For example, memory 115 may store software used by the base and terminal units, such as an operating system 117, application programs 119, and an associated database 121. Alternatively, some or all of the computer executable instructions for the units may be embodied in hardware or firmware (not shown). Database 121 may provide centralized storage.

As discussed above, the units may operate in a networked environment and may also support connections to each other, or one or more remote computing devices, such as branch terminals. The branch computing devices may be personal computing devices or servers that include many or all of the elements described above relative to the units. Branch computing devices may be mobile devices communicating over wireless channels or through a wireless LAN or WAN or any other known method.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the invention is contemplated. For example, aspects of the method steps disclosed herein such as updating data transmission characteristics may be executed on processors in the base units or the terminal units. Such processors may execute computer-executable instructions stored on a computer-readable medium.

Base Unit

Figure 3:
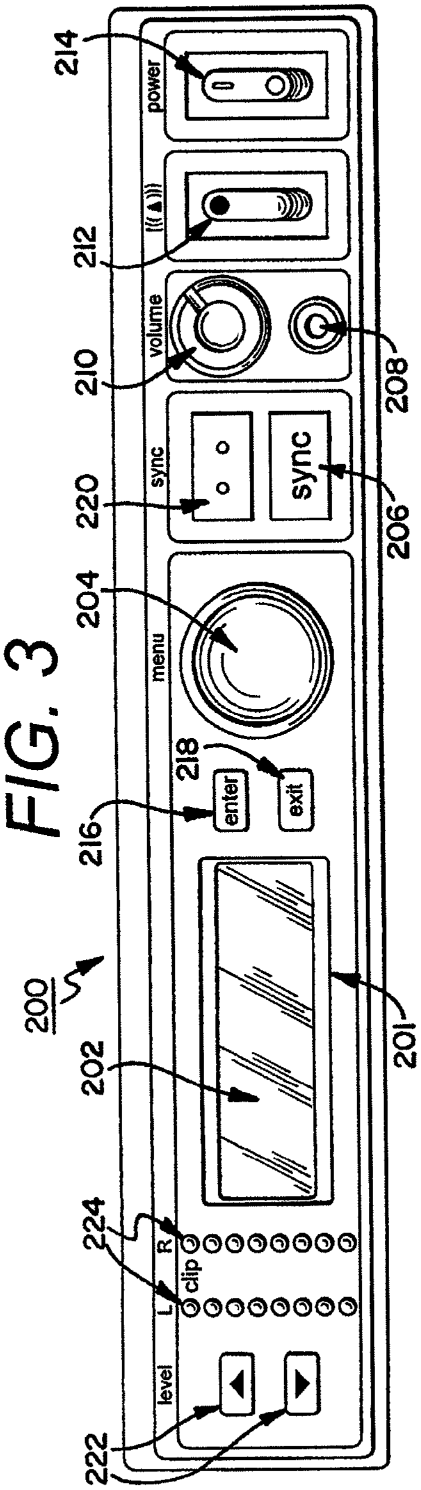
FIG. 3 depicts a front view of an exemplary embodiment of a base unit.

An exemplary embodiment of the base unit is depicted in FIG. 3. The base unit primarily acts as a transmission device for transmitting transmission settings and audio mix signals to a terminal unit. However, as discussed herein the base unit can be programmed with additional features. For example, the base unit can be provided with the ability to change transmission settings as a result of environmental changes in the monitoring system detected and communicated by the terminal unit 300 or the base units can be networked with a secondary scanning unit that allows the change to happen automatically or at a time of user input via an optional computer control over the network.

In one exemplary embodiment, the base unit 200 comprises a housing 201 containing the hardware and software components discussed above. In addition the housing 201 may be mounted with displays, including but not limited to an LCD display 202 for displaying menus, options, modes, and transmission settings and audio signal level indicators 224. The base unit 200 may also be provided with user input controls as discussed above, which in this embodiment consist of an enter push button 216, an exit push button 218, a push control knob 204, a sync push button 206, a power switch 214, an on/off RF transmission switch 212, audio signal level adjusters 222, and a volume control 210. In this embodiment the base unit 200 has an infrared port 220 for communicating with the terminal units 300 and a jack 208 for a sound transmission device for screening the mix outputted by the base unit.

In the exemplary embodiment, the infrared port 220 is provided for transmitting information, including but not limited to, frequency data, mix data, ambient level, stereo/mono, EQ, and control mapping to the terminal unit 300. As shown in FIG. 1, the base unit 200 may also include an antenna 224 for transmitting the radio signals R containing mixes to the terminal units 300. However, as discussed above any suitable data link between the base unit and the terminal unit is contemplated for transmission. The base unit may be configured to receive transmissions from the terminal unit over the suitable data link.

The base unit 200 may be rack mounted with additional base units in a stacking arrangement or may be mounted in any other suitable arrangement. As discussed above, the additional base units can be hard-wired, connected wirelessly or by any known networking method to transmit data to each other such as channel labels, frequency information, mix data, RF power output, Stereo/Mono audio transmission, CueList, and backup frequencies as defined herein.

Terminal Unit

Figure 4C:
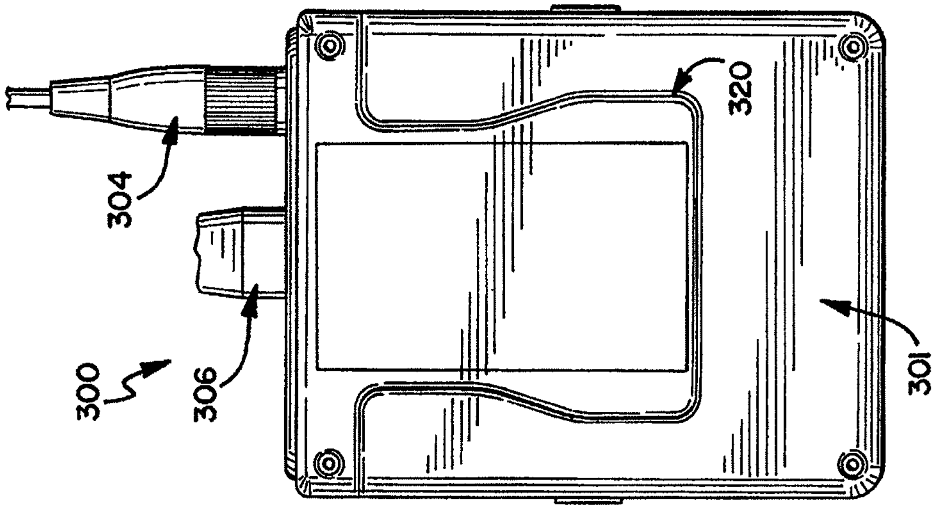
FIG. 4C depicts a rear view of an exemplary embodiment of the terminal unit.
Figure 4B:
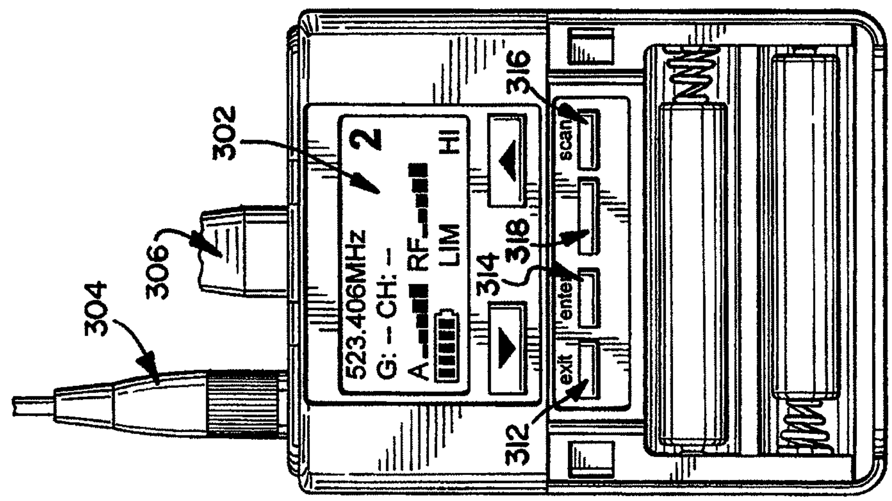
FIG. 4B depicts another front view of an exemplary embodiment of the terminal unit.
Figure 4A:
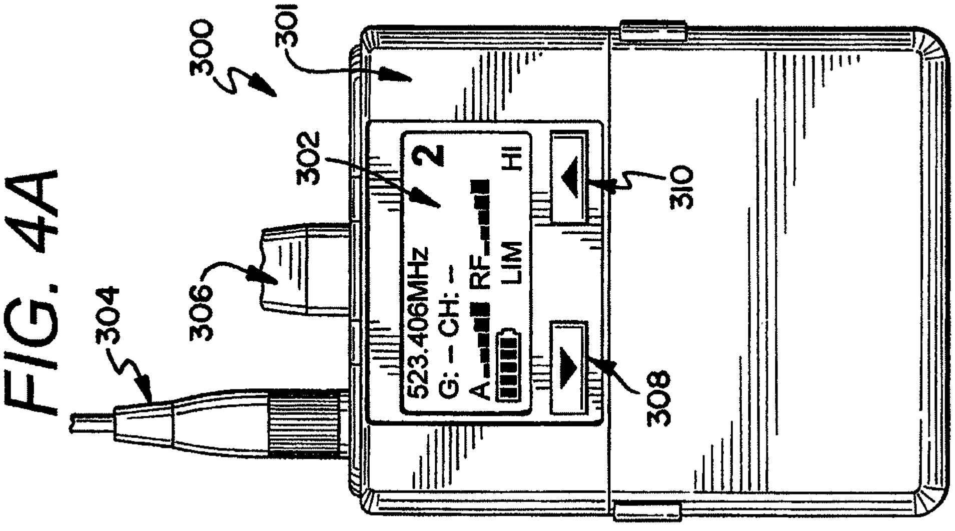
FIG. 4A depicts a front view of an exemplary embodiment of a terminal unit.

An exemplary terminal unit 300 is depicted in FIGS. 4A-4C. The terminal unit's primary function is to receive transmission settings and audio signals from the base unit. In one embodiment, the terminal unit can be configured to store transmission data, such as frequency data and mix data, sent by one or more base units. The terminal unit can be configured to assign a channel label to a particular mix. The terminal unit is then able to receive audio signals over each stored frequency and display any portion of the transmission data in any desired font or size.

As discussed herein other features may be programmed into the terminal unit 300 such as interference and feedback controls. Additionally, the terminal unit 300 may also be provided with transmission capabilities such that it can send data to the base unit 200 over any suitable connection.

In the exemplary embodiment depicted in FIGS. 4A-4C, the terminal unit 300 is provided with a housing 301 for housing the hardware and software components discussed above. The terminal unit may also include a user display as discussed above, which in this embodiment consists of an LCD display 302, which can display some or all of the transmission data in addition to a channel label that it assigns to a particular mix.

Also as discussed above, the terminal device 300 has user input controls, which in this particular embodiment consist of a first push button 308, a second push button 310, an exit push button 312, an enter push button 314, a frequency scan button 316, and a volume control 306. A jack (not shown) is provided for outputting an audio signal to an audio transmission device. The terminal unit 300 may also include an antenna 304 for receiving radio transmission from a base unit and an infrared port 318 for receiving transmission data from a base unit. In addition, the terminal unit 300 can be provided with a flexible clip 320 or other attachment means for securing the terminal unit 300 to the user's clothing. In this way the user can wear the terminal unit and the terminal unit can transmit the audio signal to the user's ears via any sound transmission device, such as earphones.

Operation of System

In one or more operation modes of the terminal unit, the user can sync the terminal unit with one or more base units in the audio monitoring system. This allows the user to select and listen to any signal output by a base unit stored in the terminal unit's memory. The user can sync the terminal unit with each base unit to receive and store all of the mix transmission data for a particular performance.

During this syncing process, each base unit can send transmission data including, but not limited to, a channel label, a frequency, a user input mix identifier, ambient level information, stereo/mono information, EQ information, and control mapping information to the terminal unit 300 for the audio signal output by the base unit. The channel label is a number that is assigned to a frequency channel. The frequency is the frequency outputted by the base unit. The user input mix identifier is a customizable title for the particular mix, which the user may add during setup of the base unit. The ambient level information includes external sound data that is allowed into the artist's mix. The stereo/mono information includes mode information (i.e. whether the mix is operating in stereo or mono mode). The EQ information includes the level of the frequency response of the audio mix. Finally, the control mapping information includes function information of the buttons on the terminal unit.

In an exemplary embodiment, the channel label associated with each base unit is assigned in accordance with the order that the base units are synched with the terminal unit (i.e., first base unit synched receives channel label number "1," second base unit synched receives channel label number "2," etc.). Thus, the order in which the base units are synched determines the corresponding assigned channel labels. Alternatively, the system can be configured such that each base unit stores an assigned channel label number and transmits the channel label number as part of the transmission data sent to the terminal unit (i.e., base unit assigned channel label number 1 is stored in terminal unit as channel "1" regardless of the order in which base units are synched). In this way, a user can assign each base unit with a channel label which remains fixed in the form of a "priority number" so that such base unit's mix appears in the same place in the list of available channels on the terminal unit. The assigned channel label can then be communicated to the terminal unit as part of the transmission data.

The terminal unit receives and stores the transmission data of each audio signal in its memory. The terminal unit permits toggling or scrolling, via the user input device, between or among each transmission data set such that it can tune to any of the available stored base unit frequencies, and display the corresponding stored base unit channel label and mix identifier. The terminal unit can receive the audio signal from the selected base unit over the stored frequency and can output the audio signal to a suitable sound transmission device.

An exemplary syncing process is depicted in FIGS. 5-7 and is described below. The process described below is merely an exemplary embodiment and is in no way intended to limit the disclosure to this particular syncing process.

Figures 5A, 5B, 5C, 6A, 6B, 7A, 7B:
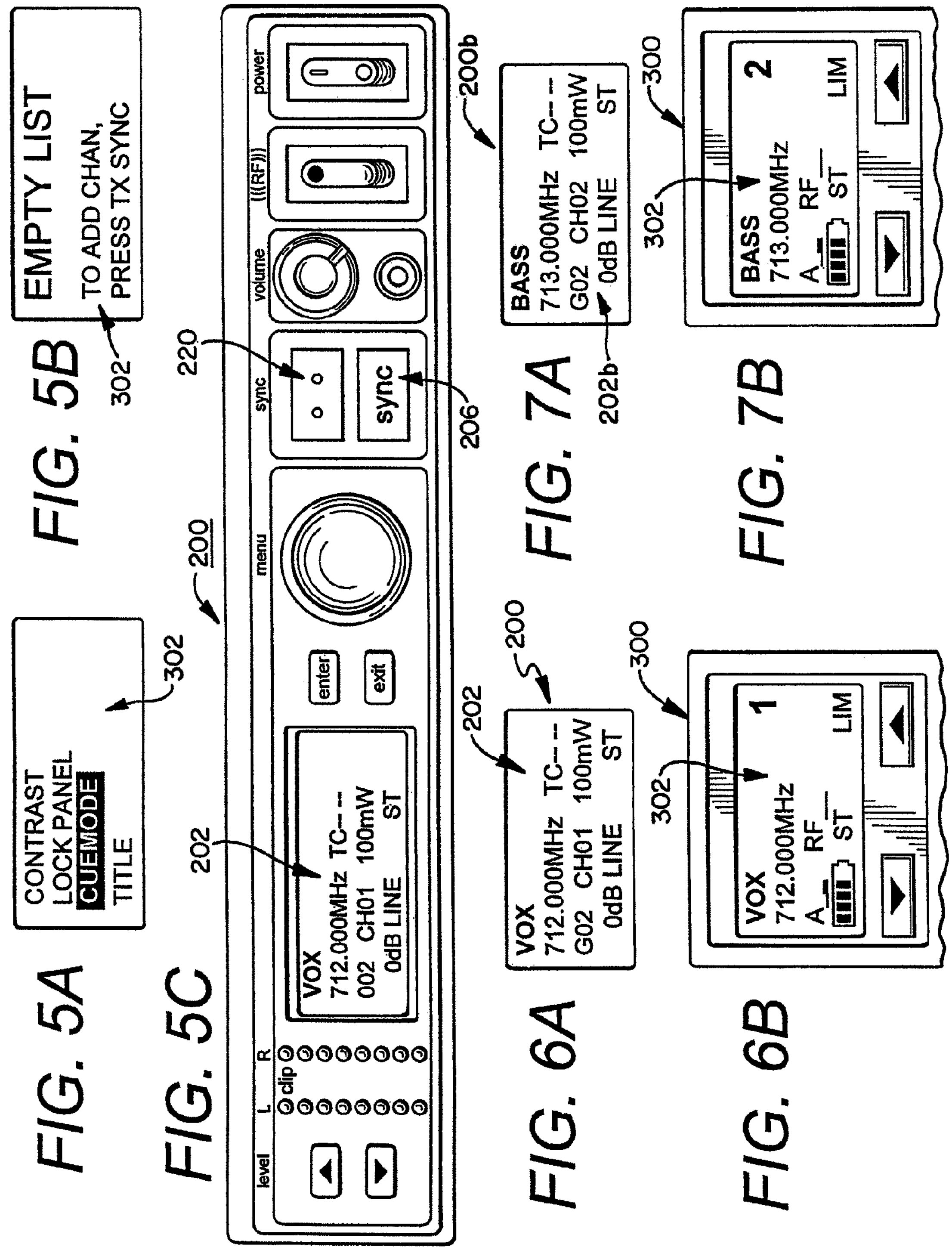
FIG. 5A depicts an exemplary display of the terminal unit.
FIG. 5B depicts another exemplary display of the terminal unit.
FIG. 5C depicts another front view of an exemplary embodiment of a base unit in an exemplary operation mode.
FIG. 6A depicts an exemplary display of the base unit.
FIG. 6B depicts another exemplary display of the terminal unit.
FIG. 7A depicts another exemplary display of the base unit.
FIG. 7B depicts another exemplary display of the terminal unit.

In an exemplary embodiment, a user must place the transmission unit into a preconfigured "mode" in order to be able to store, access, and scroll among the plurality of available base units and their associated transmission data. In the embodiment illustrated, the "CUEMODE" feature corresponds to such a mode. To begin the user selects "CUEMODE" mode on the terminal unit LCD 302 as shown in FIG. 5A (by scrolling to the "CUEMODE" feature using the first and second pushbuttons 308, 310, and selecting the desired mode by pressing the enter pushbutton 314). As shown in FIG. 5B, when in the "CUEMODE" feature the terminal unit LCD 302 can indicate when there are no channels currently stored in the terminal unit's memory. The terminal unit then instructs the user to press the sync push button 206 on the base unit 200 to receive the base unit's transmission data. The user then holds the infrared port 318 of the terminal unit 300 up to the infrared port 220 of the base unit 200 such that the terminal unit 300 is located proximate to the base unit 200 and presses the sync push button 206. As a result, the base unit transmits a set of transmission data, including the frequency "712.000 MHz," and the mix identifier "VOX" as shown in FIG. 6A to the terminal unit 300. The terminal unit 300 then stores this information in its memory and displays all or some of the information on the LCD 302 indicating that is has been stored as shown in FIG. 6B. The terminal unit 300 may also assign a channel label such as "1" to the mix.

As shown in FIG. 7A, the user can then add additional base unit data to the terminal unit's memory. In this example, the user next syncs transmission data from a second base unit 200*b* (in this case, the "BASS" mix) to the terminal unit 300. As shown in FIGS. 7A and 7B, the second base unit 200*b* transmits transmission data including the frequency "713.000 MHz," and the mix identifier "BASS" to the terminal unit 300 as shown on its display 202*b*. The terminal unit 300 also assigns a channel label "2" to the mix. The terminal unit 300 then stores and displays the transmitter information to indicate that the transmission data has been successfully stored. This process may consist of multiple iterations of downloading additional transmission data from additional base units such that when completed, the terminal unit stores in memory transmission data from a plurality of base units.

Figure 8C:
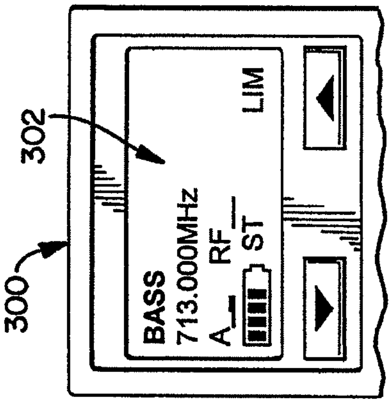
FIGS. 8A-8C depict an exemplary feature of the terminal unit.
Figure 8B:
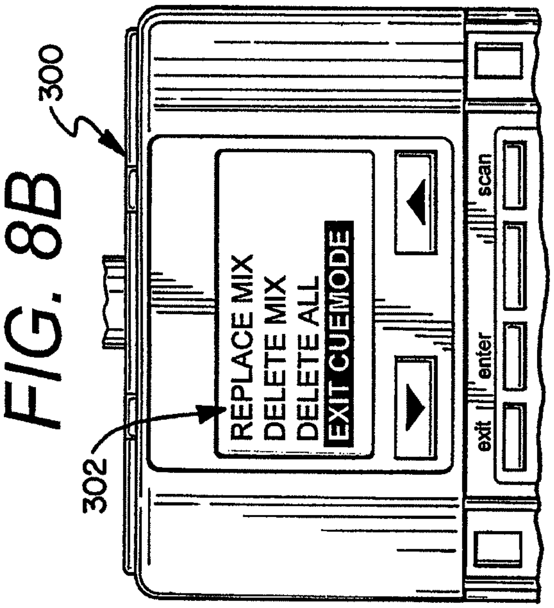
Figure 8A:
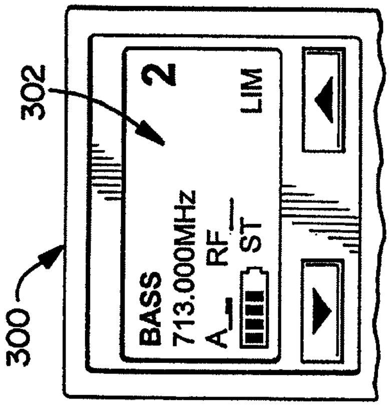

FIGS. 8A-8C depict an exemplary "hot swap" operation where the sound engineer can "swap" out a faulty terminal unit. In this case, for example, if the bass guitarist's terminal unit fails during a performance, the sound engineer can quickly provide the bassist with a different working terminal unit preloaded with the base unit's transmission data corresponding to the "BASS" mix from the particular performance. In this example, the sound engineer can quickly toggle or scroll to select the "BASS" mix on channel "2" outputting at a frequency of "713.000 MHz" on the working terminal unit and then exchange the faulty terminal unit with the working terminal unit. Optionally, the sound engineer can exit the CUEMODE feature before exchanging the working terminal unit with the faulty one so as to avoid the performer accidentally changing the mix he or she is receiving on stage. Alternatively, if the sound engineer leaves the working terminal unit active in the CUEMODE feature, the performer may select from amongst a variety of available mixes received over channels stored in the memory of the transmission unit.

Thus, by having an operational terminal unit programmed with transmission data for all of the available base units, the sound engineer is equipped with a back up unit for each and every terminal unit on stage. This provides a sound engineer with a "universal" terminal unit that can be quickly set to receive any of the available sound mixes from any of the base units. Additionally, this permits the sound engineer to listen (via a sound transmission device connected to such a "universal" terminal unit) to any of the available sound mixes by scrolling through the base unit information stored in the CUEMODE.

Networked Environment Operation

The audio monitoring system may be provided with additional features in a networked environment. These additional features are merely exemplary and are in no way intended to limit the invention to a particular configuration or process.

Instead of individually syncing the terminal unit to each base unit via an infrared link, the syncing process can be completed automatically via a data network. In this process, one or more terminal units can receive transmission data from all (or a desired subset) of the base units in the audio monitoring system via the network instead of an infrared sync process for each base unit. However, this could also occur automatically once the sound engineer configures the base units with the mixer over a network.

Additionally, the audio monitoring system can be provided with an active environmental monitoring system. In this example, one or more of the components of the audio monitoring system, such as but not limited to the terminal unit or the base unit, can include active monitoring software. The monitoring software is configured to detect interference present in the spectrum in which the wireless system operates and is configured to alter the transmission characteristics of the audio signals in the monitoring system to avoid such interference present in the monitoring system.

The monitoring of the environment (for example, the available FM spectrum) can happen in the terminal unit, within the base unit, or within a networked scanning device with optional computer control that receives user input. The terminal unit may be adapted to detect transmission problems (such as interference) and communicate with the base unit such that the base unit can change its transmission characteristics, and the terminal unit can receive the audio signal with the new clearer transmission characteristics (for example, on a different frequency). This monitoring process could also be accomplished on a computing device, such as a laptop, linked to the monitoring system. The computing device can be configured to monitor transmission data received from the terminal unit and the base unit to detect interference issues and to change transmission settings of the terminal unit and the base unit upon detecting interference. This change can happen automatically or be manually controlled by the user depending upon the chosen setting.

In an example of an automatic configuration, upon the detection of interference on a particular frequency, the frequency on which a particular base unit transmits can be changed, and the corresponding frequency stored in memory of the terminal unit can also be changed, such that the base unit transmits and the terminal unit receives on a new clear frequency.

Aspects of the audio monitoring system described herein provide the sound engineer with the ability to easily monitor all of the mixes in a given performance. This allows the sound engineer to focus on his/her job of perfecting the mix during the performance. By being able to quickly toggle to any mix among the available base units, the sound engineer will be able to accurately monitor and audition any mixes with which the performers may be dissatisfied.

As discussed above one of the potential uses for a terminal unit having base unit transmission data storage is for backup purposes should one of the performer's terminal units fail during a performance. If one of the performer's terminal units fails during a show, the sound engineer can quickly scroll a performer's desired base unit mix on a working terminal unit and swap out the faulty terminal unit.

Another potential use of the device is to provide the performer with backup frequencies in case of interference. For example, multiple base units can be programmed to output the same mix over different frequencies, thereby providing redundant transmission of the same mix. In this way, should the performer encounter interference over one or more of the outputted frequencies, the performer can quickly scroll the terminal unit to a different base unit (thus, a different frequency) to receive the same mix without interference.

In addition, should the performer desire the ability to select from a plurality of different mixes, his/her terminal unit can be programmed to tune to different base units outputting different mixes. For example, a guitarist might prefer one type of mix for acoustic guitar and another type of mix for electric guitar. The terminal unit can be programmed to tune between two base units outputting separate mixes, such that during the show the guitarist can easily switch between the separate mixes.

The configurations described herein are illustrative of the vast and flexible uses and capabilities of such a system whereby terminal units may programmed so as to be capable of being switched among a plurality of available base units and corresponding mixes.

We claim:

1. A method comprising:

providing a terminal unit with a first mode for receiving a first set of transmission data comprising a first frequency and a second set of transmission data comprising a second frequency, the first mode being configured to:

wirelessly receive the first set of transmission data at the terminal unit from a first base unit;

store the first set of transmission data in a memory of the terminal unit;

wirelessly receive the second set of transmission data from a second base unit at the terminal unit;

store the second set of transmission data in the memory of the terminal unit;

receive an audio signal on the terminal unit on one of the first or second frequency in response to a selection received from a user-input device on the terminal unit by accessing the first set of transmission data or the second set of transmission data on the memory of the terminal unit;

output the audio signal to a sound transmission device in response to the selection from the user-input device; and provide the terminal unit with a second mode selectable on the terminal unit by a first user configured to output an audio signal on the terminal unit on one of the first or second frequency and to prevent the first user or any user of the terminal unit from selecting the other one of the first or second frequency.

2. The method of claim 1 wherein the first set of transmission data and the second set of transmission data are received by the terminal unit via an infrared receiver located on the terminal unit.

3. The method of claim 2 further comprising configuring the terminal unit to receive the first set of transmission data in response to user input on the first base unit while the terminal unit is aligned with the first base unit and configuring the terminal unit to receive the second set of transmission data in response to user input on the second base unit while the terminal unit is aligned with the second base unit.

4. The method of claim 1 wherein at least a portion of the first set or the second set of transmission data is displayed on the terminal unit in response to a selection from a user input device.

5. The method of claim 4 wherein the first set and the second set of transmission data further comprise mix identifiers.

6. The method of claim 5 further comprising wirelessly receiving at least one additional set of transmission data comprising a frequency and a mix identifier from one or more additional base units at the terminal unit and storing the at least one additional set of transmission data in the memory of the terminal unit.

7. The method of claim 6 further comprising displaying the at least one additional set of transmission data on the user display on the terminal unit in response to a selection from a user-input device; receiving an audio signal on the terminal unit corresponding to the at least one additional set of transmission data in response to the selection from the user-input device; and outputting the audio signal corresponding to the at least one additional set of transmission data to the sound transmission device in response to the selection from the user-input device.

8. The method of claim 4 wherein the terminal unit assigns the first set of transmission data and the second set of transmission data a channel label.

9. The terminal unit of claim 8 wherein the terminal unit assigns the first set of transmission data and the second set of transmission data a numerical value based on the order that the terminal unit receives the first and second set of transmission data.

10. The method of claim 1 wherein the first set of transmission data and the second set of transmission data are received and stored by the terminal unit automatically.

11. The method of claim 1 wherein further comprising monitoring the first frequency and the second frequency and upon detecting interference assigning a new frequency transmission value for the first or second base units.

12. The method of claim 1 further comprising configuring the terminal unit to indicate whether there is transmission data stored therein.

13. The method of claim 1 further comprising configuring the terminal unit to instruct the user to store the first set of transmission data and the second set of transmission data in a memory of the terminal unit.

14. A terminal unit comprising:

a processor configured to wirelessly receive a first set of transmission data comprising a first frequency from a first base unit and a first mix identifier in response to a first user input and wirelessly receive a second set of transmission data comprising a second frequency of a second base unit and a second mix identifier from a second base unit in response to a second user input;

a memory configured to store the first set of transmission data, and the second set of transmission data; and a user-input device allowing selection of the first set of transmission data or the second set of transmission data by accessing the first set of transmission data or the second set of transmission data on the memory of the terminal unit; wherein the terminal unit associates the first set of transmission data and the second set of transmission data with a channel label;

wherein if the first set of transmission data is selected, the terminal unit receives a first audio signal on the first frequency from the first base unit, and if the second set of transmission data is selected, the terminal unit receives a second audio signal on the second frequency from the second base unit;

wherein the terminal unit is configured to output the first and second audio signals to a sound transmission device and to display the channel label and first frequency or second frequency: wherein the terminal unit is configured to switch to a mode selectable on the terminal unit by a first user configured to output an audio signal on the terminal unit on one of the first or second frequency and to prevent the first user or any other user of the terminal unit from selecting the other one of the first or second frequency.

15. The terminal unit of claim 14 further comprising an infrared receiver configured to receive the first and second sets of transmission data.

16. The terminal unit of claim 14, wherein the memory is configured to receive and store additional sets of transmission data comprising frequencies and is further configured to retain all stored transmission data when powered off.

17. The terminal unit of claim 14 wherein the memory comprises instructions for the processor to monitor and detect interference and to determine a new frequency transmission for the first or second base unit and to communicate the new frequency transmission to the first or second base unit.

18. The terminal unit of claim 14 wherein the terminal unit assigns the first set of transmission data and the second set of transmission data a numerical value based on the order that the terminal unit receives the first set of transmission data and the second set of transmission data.

19. An audio monitoring system comprising:

a terminal unit comprising a processor, a memory, user input device, a display and an infrared receiver;

a plurality of base units, each base unit comprising a wireless transmitter, a processor, a memory, a user input device, a display, and an infrared transmitter;

wherein each base unit is configured to send a set of transmission data via the base unit's infrared transmitter to the terminal unit's infrared receiver, the transmission data comprising a frequency and a mix identifier; and wherein the terminal unit is configured to:

(i) provide instructions to the user to store transmission data from each base unit on the display;

(ii) store the sets of transmission data received from each base unit;

(iii) receive a user selection of the available stored transmission data sets;

(iv) display at least a portion of the selected transmission data on the display;

(v) receive an audio signal from one of the base units on the frequency of the selected transmission data set by accessing the sets of transmission data on the memory of the terminal unit;

(vi) output the audio signal to a sound transmission device; and (vii) switch to a mode selectable on the terminal unit by a first user configured to output an audio signal on the terminal unit on one of the frequencies of the stored data sets and to prevent the first user or any other user of the terminal unit from selecting another frequency of the stored transmission data sets.

20. The audio monitoring system of claim 19 wherein the terminal unit associates the sets of transmission data with channel labels.

21. The audio monitoring system of claim 19 wherein the terminal unit assigns each individual set of transmission data a numerical value based on the order that the terminal unit receives the individual set of transmission data.

22. A computer program product, embodied in a non-transitory computer readable medium, comprising a computer usable medium having a computer readable program code embodied therein, said computer readable program code adapted to be executed by a processor to implement a method comprising:

wirelessly receiving a first set of transmission data comprising, a first frequency at a terminal unit from a first base unit in response to a first user input;

storing the first set of transmission data in a memory of the terminal unit;

wirelessly receiving a second set of transmission data comprising a second frequency from a second base unit at the terminal unit in response to a second user input;

storing the second set of transmission data in the memory of the terminal unit;

receiving an audio signal on the terminal unit on one of the first or second frequency in response to a selection received from a user-input device on the terminal unit by accessing the first set of transmission data or the second set of transmission data on the memory of the terminal unit;

monitoring the first base unit and the second base unit and the terminal unit for transmission interference;

in response to detecting transmission interference, changing the transmission data of at least one of the first base unit, the second base unit, and the at least one terminal unit; and configuring the terminal unit to switch to a mode selectable on the terminal unit by a first user configured to output an audio signal on the terminal unit on one of the first or second frequency and to prevent the first user or any other user of the terminal unit from selecting the other one of the first or second frequency.

23. The computer program product of claim 22 wherein the method further comprises changing the transmission data automatically upon detecting transmission interference.

24. The computer program product of claim 22 wherein the method further comprises changing the transmission data manually by user input.

* * * * *